United States Patent
Boulton et al.

(10) Patent No.: US 6,354,952 B1
(45) Date of Patent: Mar. 12, 2002

(54) SECURING MEMBERS TOGETHER BY SPRING RINGS

(75) Inventors: Frederick William Boulton, Wolverhampton; Paul John Bibb, Stafford; Anthony Green, Halecowen, all of (GB)

(73) Assignee: GKN Automotive AG (DE)

( * ) Notice: Subject to any disclaimer, the term of this patent is extended or adjusted under 35 U.S.C. 154(b) by 0 days.

(21) Appl. No.: 09/508,278

(22) PCT Filed: Sep. 7, 1998

(86) PCT No.: PCT/GB98/02681

§ 371 Date: Jul. 3, 2000

§ 102(e) Date: Jul. 3, 2000

(87) PCT Pub. No.: WO99/13232

PCT Pub. Date: Mar. 18, 1999

(51) Int. Cl.[7] .............................................. F16C 13/00
(52) U.S. Cl. ........................ 464/145; 464/178; 464/906
(58) Field of Search ................................. 285/305, 321; 403/326, 366, 155; 464/145, 178, 182, 140, 906, 179

(56) References Cited

U.S. PATENT DOCUMENTS

| 3,151,891 | A | * | 10/1964 | Sanders | 285/321 |
|---|---|---|---|---|---|
| 3,204,991 | A | * | 9/1965 | Hauk | 285/301 |
| 3,560,026 | A | * | 2/1971 | Roe | 285/321 |
| 3,701,303 | A | | 10/1972 | Kondo | |
| 5,383,938 | A | * | 1/1995 | Rohr et al. | 623/22 |
| 5,490,694 | A | * | 2/1996 | Shumway | 285/305 |
| 5,536,075 | A | * | 7/1996 | Bertetti | 301/105.1 |
| 5,876,071 | A | * | 3/1999 | Aldridge | 285/321 |
| 5,974,665 | A | * | 11/1999 | Frielingsdorf et al. | 29/894.361 |
| 6,022,275 | A | * | 2/2000 | Bertetti | 464/178 |
| 6,079,897 | A | * | 6/2000 | Schweitzer | 403/328 |
| 6,119,825 | A | * | 9/2000 | Nisley | 188/171 |
| 6,139,216 | A | * | 10/2000 | Bertetti | 403/359.3 |
| 6,193,419 | B1 | * | 2/2001 | Krude et al. | 384/544 |

FOREIGN PATENT DOCUMENTS

| DE | 197 00 313 A1 | 7/1997 |
|---|---|---|
| FR | 2 349 057 | 11/1997 |
| GB | 349329 | 5/1931 |
| GB | 1 223 050 | 2/1971 |

* cited by examiner

Primary Examiner—Lynne H. Browne
Assistant Examiner—Kenn Thompson (57) ABSTRACT

A spring ring (41) of rectangular cross section has adjacent its ends arms which extend generally radially outwardly. The ring (41) is used to hold together two members (31, 40) in telescopic engagement by engaging in an internal groove (45) in one member and in an external groove (46) in the other. During assembly of the members the ring is located entirely in one of the grooves by a holding element (51) supported wholly by the arms on the ring. After assembly the holding element is withdrawn radially outwardly through a slot (47) in the external member.

12 Claims, 7 Drawing Sheets

SECURING MEMBERS TOGETHER BY SPRING RINGS

TECHNICAL FIELD

This invention relates generally to the securing together against relative axial movement of two members in telescopic relation. The members are secured together by a spring ring which is received in cooperating grooves, an internal groove in the external member and an external groove in the internal member.

BACKGROUND ART

It is known to have internal and external members as above described in which a spring ring of circular cross section is mounted, for example, in the internal groove of the external member and the free end of the internal member is provided with a chamfer. As the free end is pushed into the external member the chamfer expands the ring and allows the internal member to telescope into the external member until the external groove in the internal member is aligned with the internal groove in the external member whereupon the ring contracts and engages the side walls of both grooves to hold the members against relative axial movement.

In this arrangement the relative dimensions of the grooves and the ring are critical since when the ring is open it must pass over the internal member but when it contracts and is in its closed state it must engage the walls of both of the aligned grooves to hold the members against relative axial movement.

In some applications where greater security is required than is given by a ring of circular cross section, a ring of rectangular section is used, the section normally having a greater dimension radially than axially. When using such a ring it tends to fall to the bottom of the internal groove in the external member and a chamfer on the internal member will not lift the ring nor open the ring when the members are telescoped together. Normally, therefore, such rings have apertured ears at or adjacent their ends and are opened by normal circlip pliers to allow assembly of the members. After assembly the ears are released when the grooves are aligned. In such an arrangement the external groove will have a slot in its base through which the ears will project so as to be accessible to the circlip pliers. In this construction it is again necessary that there is a very specific relation between the dimensions of the ring and of the grooves. The internal groove in the external member must be deep enough to receive the ring completely to allow assembly and the external groove will be less deep.

While in the foregoing we have described the spring ring being held open during assembly of the members, it is equally possible for the spring ring to be held closed during assembly of the members and then released so that it expands into mutually aligned grooves in the members to hold them together. In such a case the external groove in the internal member must be deep enough to receive the ring completely to allow assembly and the internal groove will be less deep.

It has previously been proposed in GB-A- 1 514 690 to have a bridge member which fits into the holes in the ends of a normal circlip and which may be used to hold the circlip open or closed during an assembly operation and then removed to allow the circlip to spring back to its unstressed state. In this arrangement the bridge piece has to be removed in a direction perpendicular to the plane of the circlip and in many assemblies this is not possible.

GB-A-349 329 shows, in FIG. 1, a ring to hold a gudgeon pin in place by engaging in an internal groove in the pin bore. The ring is held in its expanded state by a grooved disc inserted between internally projecting arms on the ring. This arrangement is not suitable for many applications.

Finally, in GB-A-1 137 436 there is shown an arrangement in which an external member has an internal groove which opens through a slot to the exterior of the member and a circlip is used which has long arms which project through the slot into a recess. The circlip can be held by circlip pliers in a closed position during assembly of the members and then allowed to expand to hold the members together. In this case there is no external groove in the internal member. This arrangement is not suitable for use in many applications where there is no access to be able to engage the arms of the circlip with circlip pliers.

In GB-A-1 223 050 there is disclosed an assembly of an external member in telescopic relation with an internal member, the external member having a bore, an internal groove in the bore and a slot extending radially of the bore between an inner end open to the bore and an outer end at the external surface of the external member, the slot extending axially between said groove and an end of the external member. The internal member and the external member are capable of being held in assembled position by a spring ring engaged in said groove and in an external groove of the internal member, the ring having, adjacent its ends, arms which extend generally radially outwardly into said slot. To assemble the members the end portions of the arms, which extend radially outwardly of the slot, have to be drawn together while the parts are telescoped and then released. To enable said end portions to be drawn together it is necessary to have access to the external member during the telescoping operation. In some circumstances, eg. where the external member is itself surrounded by another element, this is not possible and this prior construction is not usable.

In US-A-3 701 303 there is shown, in FIGS. 5 and 6, a stop ring for fitting onto a shaft having a groove. The stop ring has arms on which there are formations which may be engaged by the nipples of pincers for expanding the ring. The pincer nipples may be engaged with and disengaged from the arm formations in directions radially of the ring. Again this arrangement requires radial access to the ring which is not always possible.

Thus in many applications using rings of rectangular section it is not convenient or even possible to use circlip pliers to hold the ring open or closed during assembly of internal and external members either because of the location of the grooves with reference to other parts of an assembly and/or the method of assembly of the members. In these circumstances, none of the known arrangements described above would be suitable for assisting in the assembly of the members.

In such circumstances, therefore, it is necessary to find some means of holding the spring ring open or closed while assembling the members in telescopic relation and then allowing the ring to be released to contract or expand to its normal form when the internal and external grooves are aligned so that the ring engages the walls of both grooves to hold the members in the desired axial position.

DISCLOSURE OF INVENTION

It is an object of one aspect of the invention to provide a method of securing together, by means of a spring ring, two members in telescopic relation which may be used in confined situations where the prior art is not usable.

According to this aspect of the invention we provide a method of securing together, by means of a spring ring, an external member in telescopic relation with an internal member, wherein the external member has a bore, an internal groove in the bore and a slot extending radially of the bore between an inner end open to the bore and an outer end at the external surface of the member, the slot extending axially between said groove and an end of the member, and wherein the spring ring is engaged in said groove to locate the internal member and has, adjacent to its ends, arms which extend generally radially outwardly into said slot; characterised in that the internal member has an external groove and in that the method comprises mounting the spring ring in one of said grooves, releasably holding the ring in a contracted or expanded state so that it lies substantially within said one groove by engaging the ring arms with a holding element which is supported wholly by the ring, telescoping the members together while the arms are engaged with the holding element until the grooves in the members are mutually aligned and so that the ring arms and holding element are located in said slot and withdrawing the holding element radially through the outer open end of the slot thus disengaging said arms from the holding element and releasing the ring so that the ring expands or contracts to engage in both of the mutually aligned grooves to secure the members together.

It is an object of another aspect of the invention to provide a telescopic assembly capable of being secured together by the method set forth above.

According to this aspect of the invention we provide a telescopic assembly of an external member and an internal member, wherein the external member has a bore, an internal groove in the bore and a slot extending radially of the bore between an inner end open to the bore and an outer end at the external surface of the member, the slot extending axially between said groove and an end of the member, the members being held in assembled position by a spring ring engaged in said groove and locating the internal member, the ring having, adjacent its ends, arms which extend generally radially outwardly into said slot; characterised in that the internal member has an external groove and the ring engages both of said grooves to hold said members assembled.

It is an object of another aspect of the invention to provide the combination of a spring ring and a holding element which is usable in the method and assembly referred to above.

According to this aspect of the invention we provide the combination of a spring ring of rectangular cross section, the ring having a state of rest in which it is in either an open state or a closed state and has ends adjacent to which are arms which extend generally radially outwardly, with a holding element dimensioned to engage said arms releasably to hold the ring out of its state of rest in a stressed state in which the ring is in either a closed state or open state respectively; characterised in that (1) the holding element has oppositely-facing surfaces which engage generally-radial, oppositely-facing surfaces on the edges of the arms to hold the ring in its stressed state, (2) in that said surfaces on the arms and the holding element can be disengaged by radially outward movement of the holding element relative to the arms and (3) in that the holding element has a part remote from said surfaces whereby it may be gripped.

BRIEF DESCRIPTION OF THE DRAWINGS

The invention will now be described in detail by way of example with reference to the accompanying drawings in which.

BEST MODE FOR CARRYING OUT THE INVENTION

Figure 1:
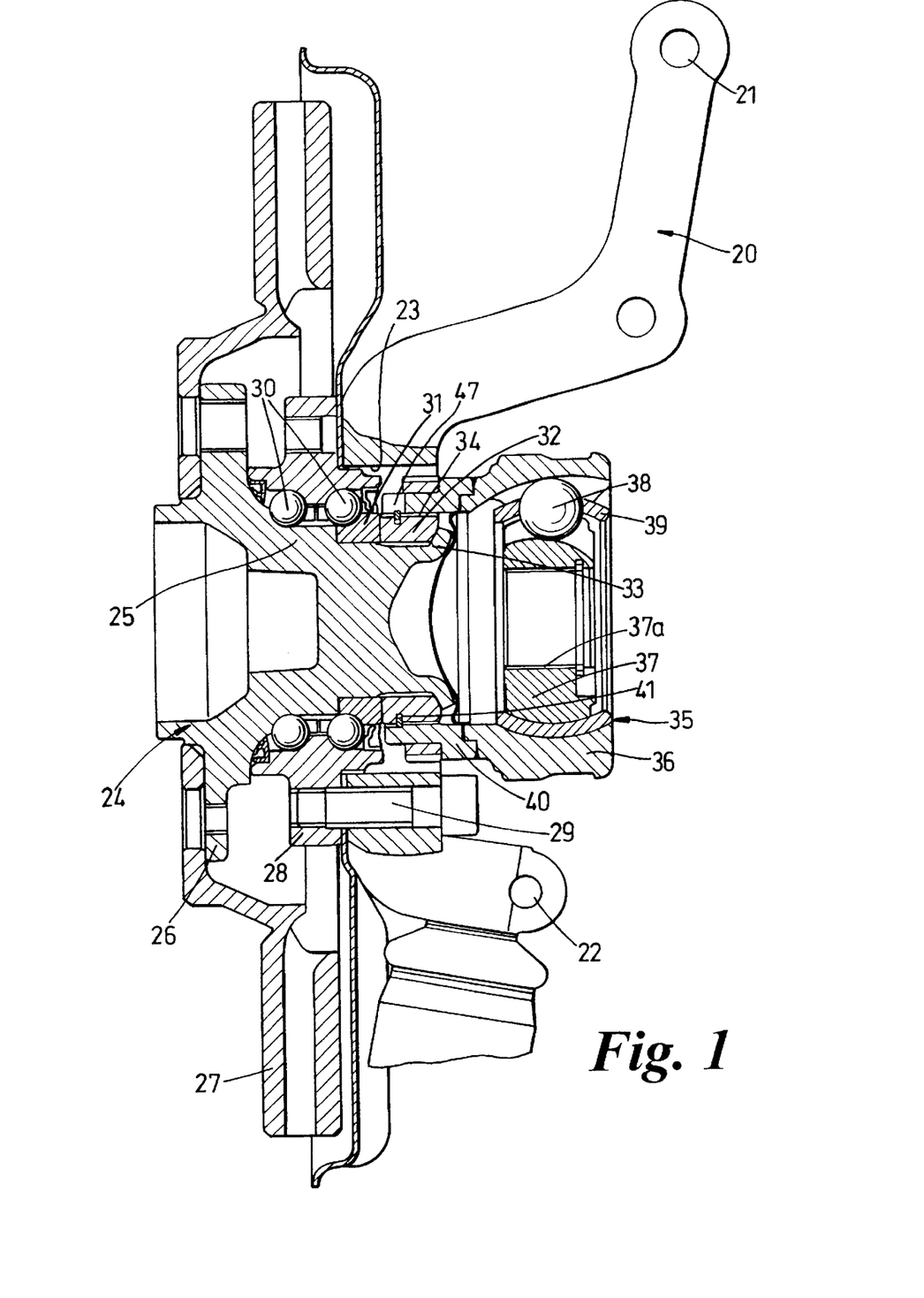
FIG. 1 is a cross section through an assembly of a motor vehicle wheel bearing and a constant velocity joint in which the two members are connected together by the method according to the invention.

Referring first to FIG. 1, the steering knuckle of a motor vehicle is indicated at 20 and has means 21 and 22 at its upper and lower ends for connection to the suspension of the motor vehicle. The knuckle is provided with a central aperture 23 in which is mounted a wheel bearing indicated generally at 24. The inner part of the wheel bearing is indicated at 25 and has a flange 26 to which a brake disc 27 can be attached by bolts, not shown. The outer part of the wheel bearing is indicated at 28 and is secured to the knuckle by bolts, one of which is indicated at 29. Between the inner and outer bearing parts are two rows of bearing balls 30, the inner race of the right hand row being provided by a ring 31 which is held in position by a further ring 32 which in turn is held in position by the swaged inner end 33 of the inner part 25 of the wheel bearing. The outer surface of the ring 32 is splined as indicated at 34.

A constant velocity joint is indicated generally at 35 and comprises an outer race 36, an inner race 37, balls 38 received in grooves in the inner and outer races and a cage 39. Secured to the outer race is an internally splined ring 40 which fits on the splines 34 of the ring 32. The rings 32 and 40 are held together by a spring ring 41 received in an internal groove in the ring 40 and an external groove in the ring 32 as will be described in more detail below. A drive shaft, not shown may be engaged in a splined bore 37a in the inner race 37.

Figure 2:
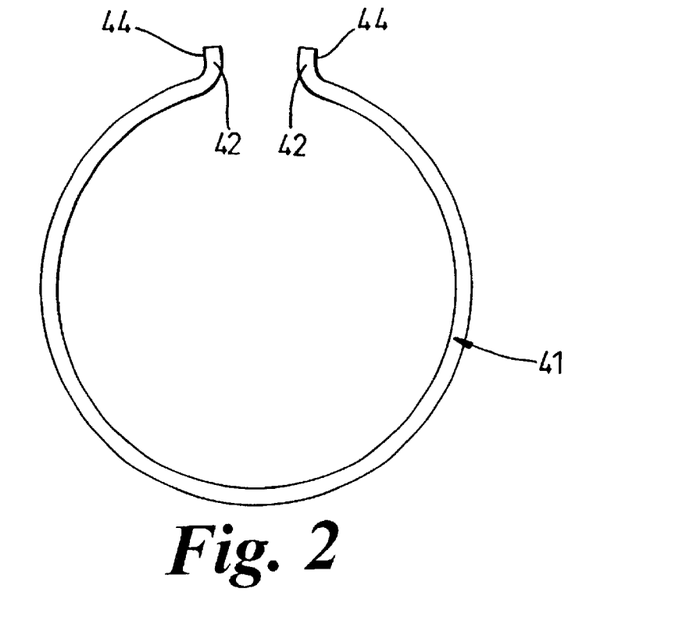
FIG. 2 is an elevation of the spring ring used in the assembly of FIG. 1.

FIG. 2 shows the ring 41. The ring is of rectangular cross section and its radial dimension is greater than its axial dimension. The ring is provided with two arms 42 at its ends.

The outer surfaces of the arms 44 diverge at a small angle of about 10–11°.

Figure 4:
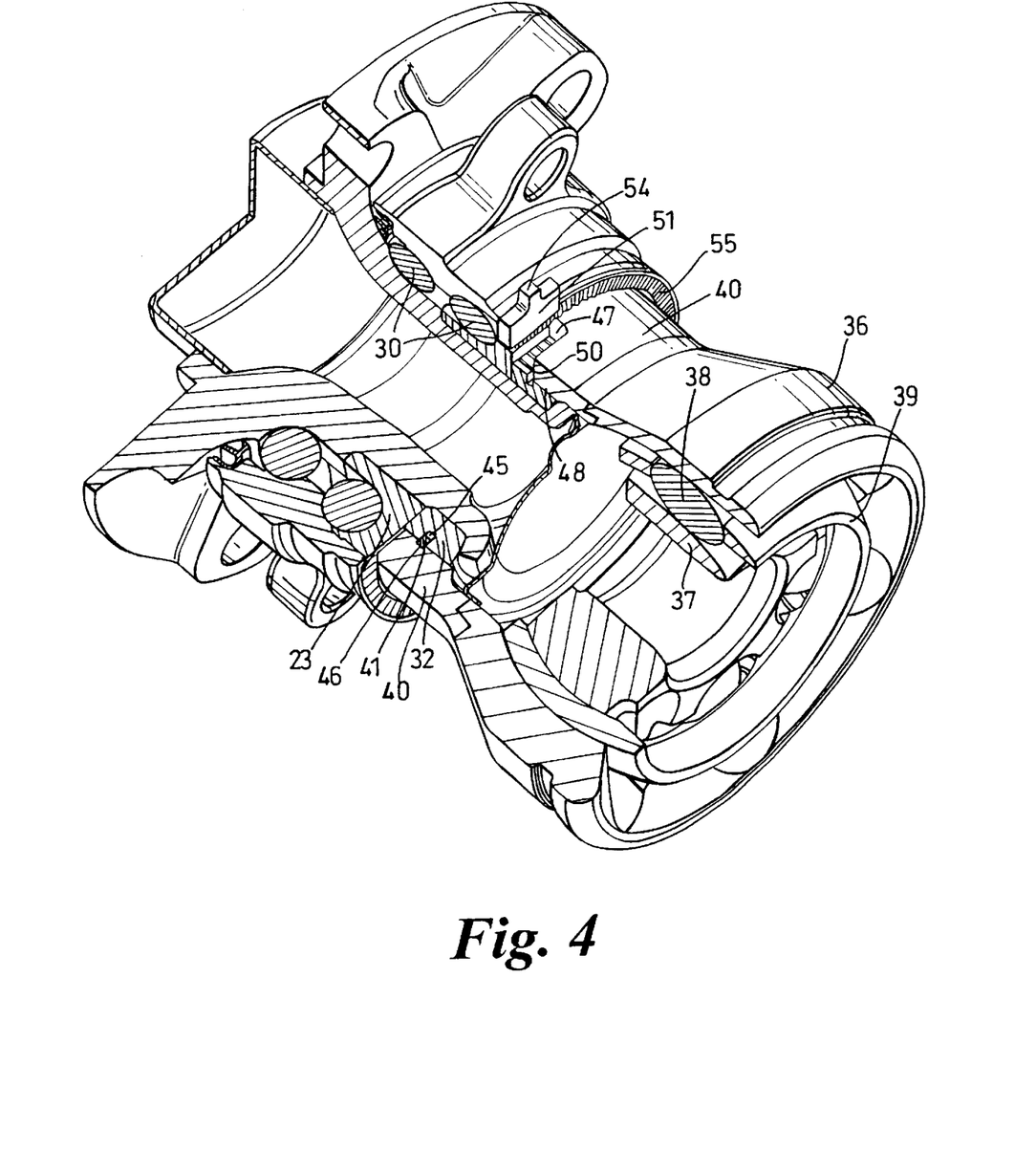
FIG. 4 is a cut-away perspective view of part of the assembly shown in FIG. 1.
Figure 5:
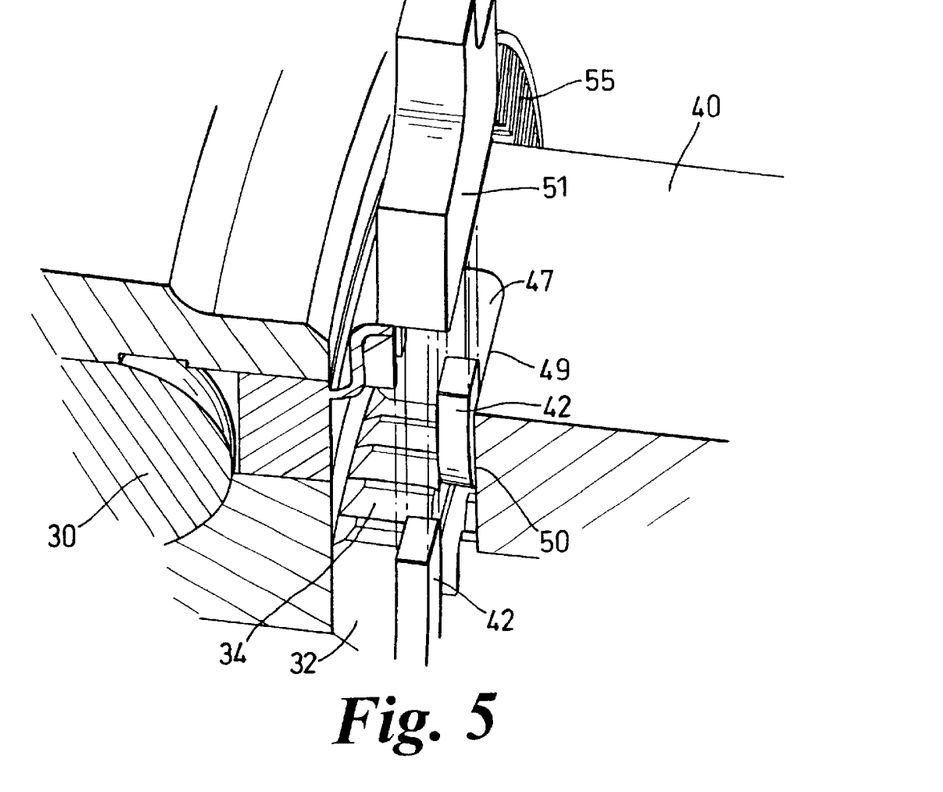
FIG. 5 is an enlarged view of part of FIG. 4 illustrating the holding element and both ends of the spring ring.
Figure 6:
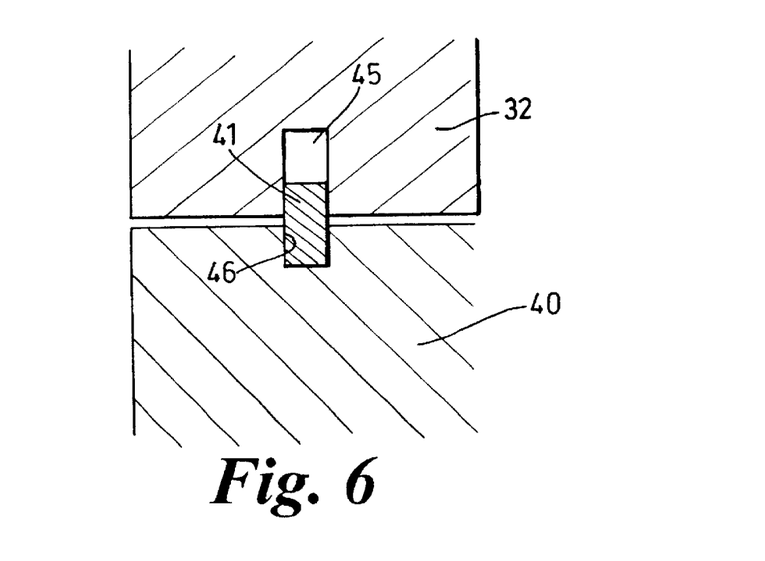
FIG. 6 is a detail cross-section showing the spring ring in position in the assembly.

Referring to FIGS. 4, 5 and 6, the ring 41 is received in an external groove 45 in the ring 32 on the wheel bearing and an internal groove 46 in the ring 40 forming part of the outer race of the constant velocity joint. The spring ring is one which has a state of rest as shown in FIG. 2 with the arms spaced from one another and may be contracted into a stressed state in which the arms 42 approach one another. As shown in FIG. 6 the ring 41 substantially fills the internal groove 46 and projects into the external groove 45.

It will be seen that the ring 40 is provided with a slot 47. This slot extends between the bore 48 of the ring 40 and its outer end 49 is at the external surface of the ring. The slot also extends inwardly and has an inner wall 50, the outer end of the slot being open to the outer end of the ring 40.

Figure 3:
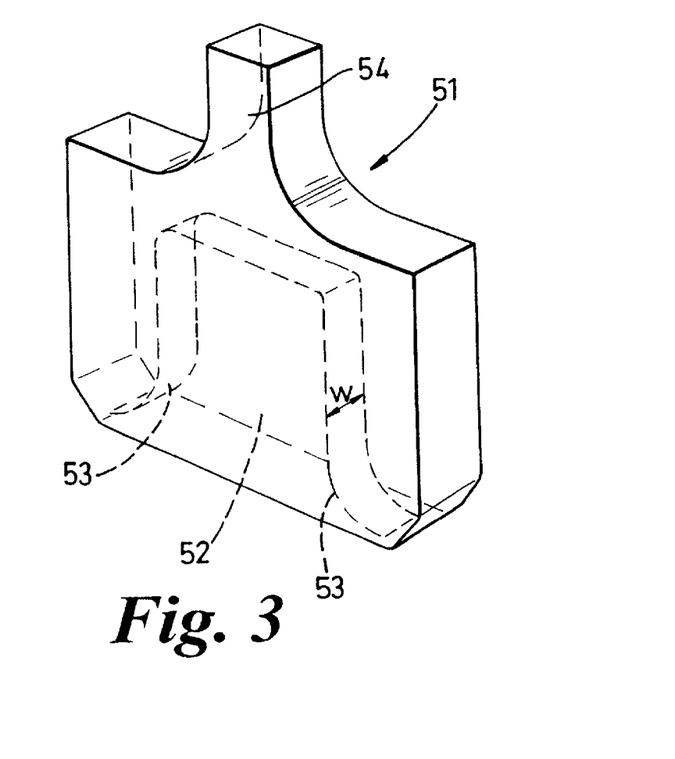
FIG. 3 is a perspective view of a holding element with its internal shape shown dotted and which is used in the assembly of the members shown in FIG. 1.

During assembly of the members, the ring is held in a contracted state by means of a holding element 51 shown in detail in FIG. 3. The holding element may, for example, be moulded from plastic material or could be made of metal. The holding element is made of a solid block and has a central aperture 52. This aperture has a width w which is just greater than that of the arms 44 of the ring so that the arms can be engaged in the aperture; the mouth of the aperture is chamferred at 53. The holding element has a portion 54 whereby it can be gripped. This portion is narrower than the portion having the aperture 52.

To assemble the members the ring 41 is mounted in the groove 45 in the ring 32 forming part of the inner part of the wheel bearing. The arms 42 of the ring are then contracted together. The arms of the contracted ring are inserted into the aperture 52 in the holding element 51 and this holds the ring in its stressed position in which it is completely contained within the internal groove 45 in the ring 32. During insertion of the arms 42 into the holding element the outer surfaces 44 of the arms 42 engage the chamfers 53 in the holding element.

The members are then telescoped together with the splines in the rings 32 and 40 engaging one another and in an orientation such that, as the parts move together, the holding element 51 which is holding the arms of the ring 41, is received in the slot 47. When the parts are fully telescoped, the internal groove 46 in the ring 40 will be aligned with the internal groove in the ring 32 and the holding element 51 will be lodged in the slot 47. The gripping portion 54 of the holding element is then gripped and pulled radially outwardly of the slot thus releasing the arms 42 on the ring 41 as shown in FIG. 5 and allowing the ring to expand to its position shown in FIGS. 2 and 6. In this position the ring fully fills the external groove 46 and partially fills the internal groove 45.

The holding element 51 is dimensioned to fit snugly in the slot 47 and can be removed through a hole, not shown, in the knuckle 20. The hole may be that designed to receive the ABS sensor or may be provided specially for the purpose. In FIGS. 4 and 5 the ABS ring is shown at 55.

It will be seen that the use of the holding element 51 enables the parts to be assembled together easily while the arms 42 of the ring are held together by the element 51. It would not be possible to hold the arms together with a pair of circlip pliers for example because the wheel bearing and CV joint are mounted in the knuckle and the ends of the ring are therefore not accessible except through a hole provided either for the ABS sensor or for the holding element as mentioned above.

When the parts are assembled the ring is in its unstressed state as shown in FIG. 2. If desired a gauge may be inserted into the slot 47 to ensure that the ring has fully expanded, the gauge being dimensioned to enter between the ring arms 42.

Alternatively, as will be described below, an appropriate part of the holding element may be provided which, if the element is inverted, will go back into the slot and hold the ends of the ring open.

Figure 7:
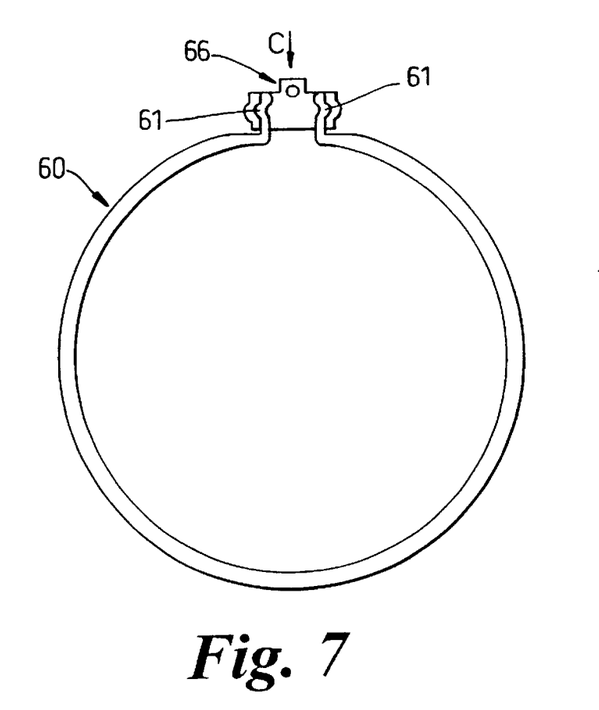
FIG. 7 is an elevation of a modified form of spring ring with a holding element holding the ring closed.

Referring to FIG. 7, a spring ring 60 is shown having a rectangular cross section in which the radial dimension is greater than the axial dimension. At its ends, the ring is provided with arms 61 which are shown in detail in FIG. 9. Each arm has an inwardly facing radial surface 62 which is provided with a part-circular depression 63. The outwardly facing radial surfaces of the arms have inclined portions 64 which terminate in projections 65. The outer radial surface of the ring is relieved at 61a adjacent to each arm 61.

Figure 11:
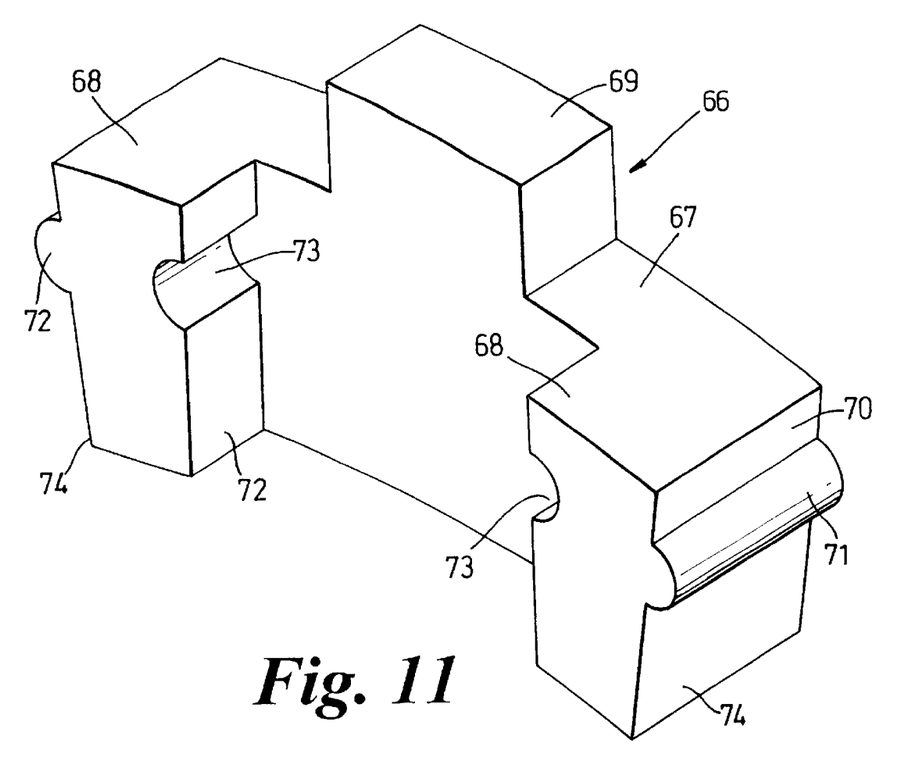
FIG. 11 is a perspective view of the holding element shown in FIG. 7 and 8.
Figure 12:
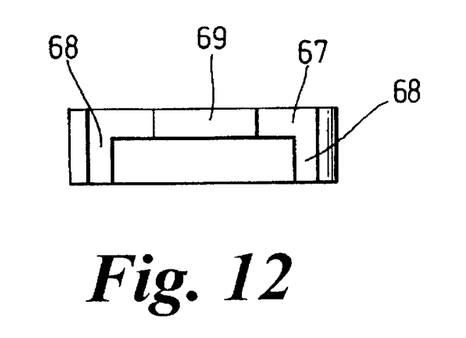
FIG. 12 is a plan view of the holding element of FIG. 11.

The holding element is indicated generally at 66 in FIG. 7 and is shown in more detail in FIGS. 11 and 12. The holding element may conveniently be a plastic moulding. As is clear from FIGS. 11 and 12 the holding element is of generally U-shape having a base 67 and arms 68. A tab 69 extends from the base and may be gripped with pliers to move the holding element into and out of position. The outer surfaces 70 of the arms 68 have projections 71 and the inner surfaces 72 of the arms have depressions 73. The outer walls 70 taper slightly to the ends 74.

As shown in FIG. 7, the holding element can be used to hold the ring in its closed position which may be its unstressed position. This is effected by sliding the holding element into engagement with the arms 61 in the direction of the arrow C in FIG. 7. The inclined portions 64 of the arms engage the surfaces 72 and as the holding element is moved inwardly in the direction of the arrow C the inner surfaces 72 move down the inclined surfaces 64 until the projections 65 at the arms are received in the depressions 73 in the holding element. The holding element is thus held releasably in position and can be removed from the ring by grasping the tab 69 and moving the holding element in the direction opposite to the arrow C.

Figure 8:
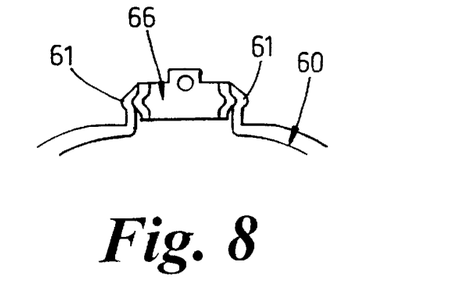
FIG. 8 is a detail of FIG. 7 but showing the holding element holding the ring open.

FIG. 8 shows how the holding element can be used to hold the ring in its expanded position e.g. in its stressed state. In this position the projections 71 on the arms of the holding element are received in the depressions 63 in the internal surfaces of the arms 61 and thus hold the ring in its expanded position to allow assembly of two telescopic members.

The ring 60 and the holding element 66 may be used in assembling the members described in relation to FIGS. 1, 4 and 5. Thus the ring may be inserted in the internal groove 46 in the ring 40 forming part of the outer race of the constant velocity joint with the arms 61 received in the slot 47. The holding element 66 may then be inserted between the arms as shown in FIG. 8 to hold the ring in an expanded, stressed condition so that it is wholly within the internal groove 46. The parts may then be telescoped as described above until the grooves 45 and 46 are in alignment whereupon the holding element 66 can be withdrawn through the slot 47 which will result in the ring returning to its unstressed state as shown in FIG. 7 in which it will engage both grooves 45 and 46.

The holding element can then be re-inserted into the slot 47 so that it assumes the position shown in FIG. 7 and holds the ring in its unstressed state in engagement with both grooves. This prevents the possibility of the ring expanding under centrifugal force in use to disengage itself from the groove 45.

During an assembly operation, therefore, once the ring 60 has been installed and the holding element 66 replaced as shown in FIG. 7, inspection of the assembly will show that the ring is properly installed.

Figure 9:
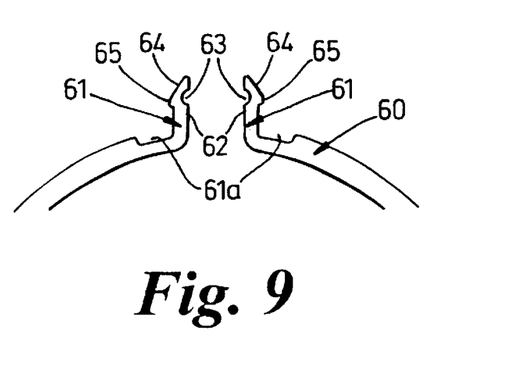
FIGS. 9 and 10 are detail views of alternative formations of the arms on the ring of FIG. 7.
Figure 10:
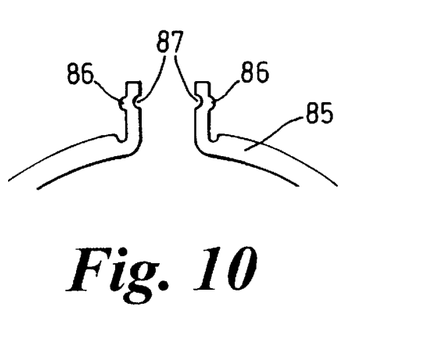

FIG. 10 shows a somewhat different design of arm for a spring ring 85; it operates in a way similar to the arms shown in FIG. 9 but has rounded projections 86 on the outer surfaces of the arms and recesses 87 on the inner surfaces thereof.

Figure 13:
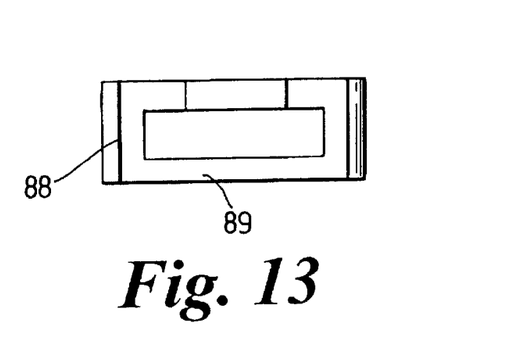
FIG. 13 is a plan view of a slightly different form of holding element.

FIG. 13 shows a holding element 88 which is substantially identical to that described in relation to FIGS. 11 and 12 except that instead of being U-shaped in section it is in the form of a substantially rectangular tube with a wall 89 closing the mouth of the U. The operation of the holding element will be exactly as described above but the extra wall prevents the holding element being inadvertently moved off the arms in an axial direction.

Figure 14:
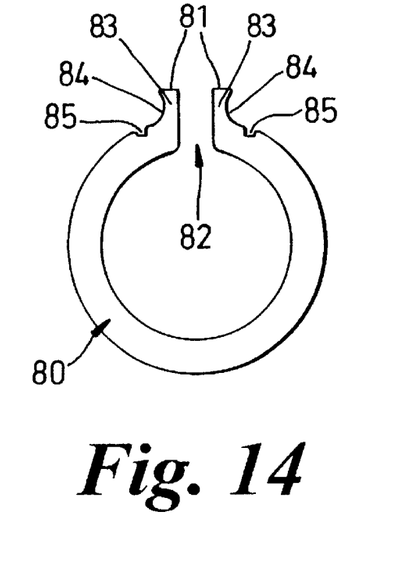
FIG. 14 is an elevation of a further modified form of spring ring usable in the invention.

A further modification of the invention will now be described in relation to FIGS. 14 to 16. Referring now to FIG. 14, a spring ring is shown at 80. The ring has a rectangular section with the radial dimension of the transverse section of the ring being greater than the axial dimension. The ends of the ring are indicated at 81 and in the unstressed state of the ring there is a gap 82 between the ends. The ends have radially outwardly-extending arms 83 and these have concave formations 84 in their outwardly-facing surfaces. Formed in the outer periphery of the ring adjacent to the arms are notches 85.

In using this ring to hold two telescopic members together, as described above in relation to FIGS. 4 and 5, the ring is mounted in the external groove 45 in the inner ring 32 and the ends 81 are then brought together by a tool as will be described. A holding element then engages the ends of the arms to hold the ring in its contracted state. When the parts have been assembled the holding element is removed and the ring returns to its unstressed state shown in FIG. 14 as previously described.

Figure 15:
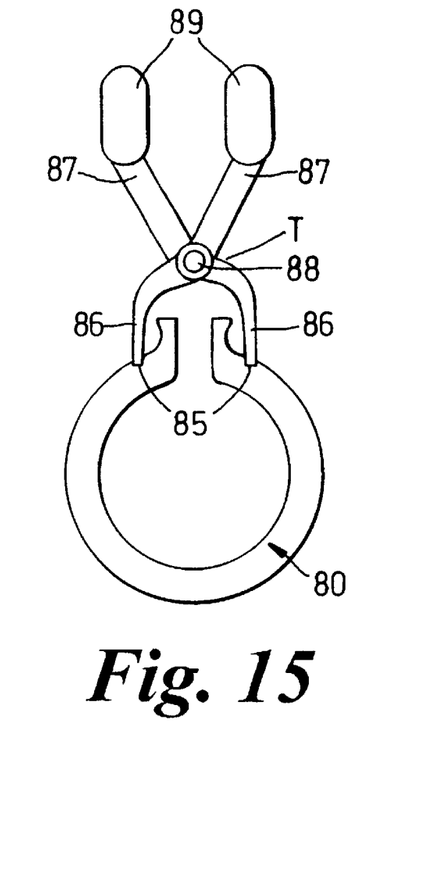
FIG. 15 is an elevation of the ring of FIG. 14 showing a tool to bring its ends together.

FIG. 15 shows the notches 85 in the ring 80 being engaged by the ends of jaws 86 of a plier-like tool T consisting of two arms 87 pivoted at 88. The arms 87 have handles 89. By moving the handles 89 towards one another the jaws 86 are brought towards one another and therefore the ends 81 of the ring 80 are brought together.

Figure 16:
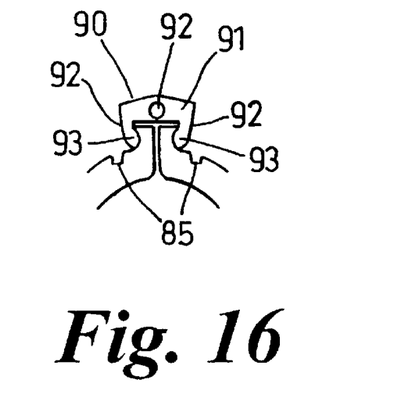
FIG. 16 is a detail view showing a holding element embracing the arms on the ring.

When this has been done a holding element 90 can be slipped over the arms 83 to hold the arms 83 and the ends 81 together as shown in FIG. 16. The holding element 90 is generally U-shaped having a base 91 and arms 92. The arms slope inwardly and have convex formations 93 which engage in the concave formations 84 in the arms. The holding element 90 may be made of resilient material so that it can be easily slid over the ends of the arms 83 so that the convex formations 93 are received in the concave formations 84.

The ring is used to hold together two telescopic members of the form, for example, as shown in FIGS. 4 and 5. In use, the ring 80 is placed in the groove 45 in the ring 32 and if necessary is sprung open to be received in the groove. When the ring is in the groove, the notches 85 are engaged by the jaws 86 of the tool T and the ends of the ring are brought together. The holding member 90 is then slipped over the ends of the ring to hold it in a contracted position. In this position the ring is wholly received in the slot 45. As described above the parts are moved so that the grooves 45 and 46 are in alignment and then the holding element 90 is removed through the slot 47 from the arms 83 which allows the ring 80 to move to its unstressed state in which it fills the groove 46 while also being partly received in the groove 45. To facilitate removal of the holding element the latter may have an aperture 92 formed in the base thereof which may be engaged with a hook or similar tool.

Figure 17:
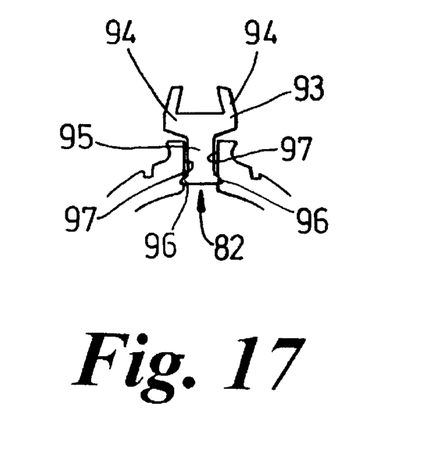
FIG. 17 is a detail view of a modified holding element holding the arms of the ring apart.

FIG. 17 shows a modified holding element. In this figure the holding element comprises a U-shaped part 93 having arms 94 which can engage the arms 83 on the ring 80 in a manner similar to that shown in FIG. 3 and also a projecting portion 95 which, as shown, can be inserted into the gap 82 between the arms 83 when the ring is in its unstressed state. The projecting portion 95 may have projections 96 at its ends which are received in notches in the inwardly-facing surfaces 97 of the arms thus to retain the holding element in the position shown in FIG. 17.

In using the modified holding element, the insertion of the ring into the groove 45 in the ring 40 and the assembly of the members would be as before. Once the holding element had been removed and the ring had moved to its unstressed state to engage in both grooves 45 and 46, the holding element would be turned round and the projection 95 inserted through the slot 47 into the gap 82 to hold the ring in its unstressed state thus substantially filling the groove 46. The holding element would be releasably held in position by the projections 96 as described.

It will be seen that the invention provides a means and method for assembling two members to be held together with a spring ring in circumstances when access to the ring by normal circlip pliers is precluded.

What is claimed is:

1. A method of securing together, by way of a spring ring of rectangular cross-section, an external member in the form of an outer race of a constant velocity joint in telescopic relation with an internal member in the form of part of a motor vehicle wheel bearing, wherein the external member comprises a bore, an internal groove in the bore and a slot extending radially of the bore between an inner end open to the bore and an outer end at an external surface of the member, the slot extending axially between said groove and an end of the member, wherein the internal member has an external groove, wherein the spring ring is engaged in said grooves to secure the members together and has, adjacent to its ends, arms which extend generally radially outwardly into said slot, the method comprising:

mounting the spring ring in the groove in the internal member;

releasably holding the ring in a contracted state so that it lies substantially within said groove;

telescoping the members together while the ring is in said contracted state until the grooves in the members are mutually aligned and so that said arms move along the slot from said end of the external member; and releasing the ring so that the ring expands to engage in both of the mutually aligned grooves to secure the members together, and wherein generally radial, oppositely-facing surfaces on the arms are engaged with oppositely facing surfaces on a holding element prior to the telescoping of the members so as to hold the ring in said contracted state in the groove of the internal member, the holding element being supported solely by the arms, the holding element moving along the slot from said end of the external member as the members are telescoped and being located in said slot when the members have been telescoped so that said grooves are aligned and the holding element being disengaged from said arms to release the ring to expand to engage in both of said grooves by radial movement out of said slot.

2. A method according to claim 1 comprising, after the holding element has been disengaged from said arms so that the ring has expanded to engage in both of said grooves, inserting the holding element into the slot and engaging the holding element with generally radial, oppositely; facing surfaces on the arms by relative movement of the holding element and the arms in a direction radially of the ring so that the holding element is supported solely by the arms and holds the ring in its expanded state in which it is engaged in both of said grooves.

3. A method according to claim 1 comprising engaging the holding element with outwardly facing surfaces on the arms to hold the ring in said contracted state.

4. A method according to claim 1 wherein the ring, when the members are secured together, lies within an aperture in a vehicle steering knuckle secured to the internal member, said knuckle having a radial hole opening into said aperture and in line with the groove in said internal member; and wherein the holding element moves into the aperture of said knuckle as the members are telescoped together, the holding element being disengaged from the arms by gripping a portion of the holding element through said radial hole and withdrawing the holding element radially of the ring through the outer open end of the slot and the radial hole.

5. A method according to claim 1 wherein the ring has formations in its outer periphery adjacent to the arms for engagement by a tool and is contracted by the tool engaging with said formations when the ring is in the external groove of the internal member after which the arms are engaged by the holding element and the tool is disengaged from the ring so that the holding element is supported solely by the arms.

6. An assembly comprising:

an external member in the form of the outer race of a constant velocity joint and having a bore, an internal groove in the bore and a slot extending radially of the bore between an inner end open to the bore and an outer end at an external surface of the member;

the slot extending axially between said groove and an end of the member, an internal member in the form of part of a motor vehicle wheel bearing in telescopic relation with the external member, the internal member having an external groove axially aligned with the internal groove;

a spring ring of rectangular cross-section adapted to engage said aligned grooves to secure the members together, the ring comprising, adjacent to its ends, arms which extend generally radially outwardly into said slot; and a holding element located in said slot, wherein generally radial, oppositely-facing surfaces on the arms are engaged with oppositely facing surfaces on said holding element so as to hold the ring in a contracted or expanded state so that the ring lies either substantially in the groove of the internal member or in both of the grooves the holding element being supported solely by the arms within the slot.

7. An assembly according to claim 6 wherein the holding element comprises a U-shaped cross section, the surfaces of the arms of the U-shape providing said oppositely-facing surfaces which engage the arms to hold the ring in its contracted state.

8. An assembly according to claim 7 wherein the holding element comprises a hollow rectangular shape in cross-section and is dimensioned to receive the arms of the ring within the rectangle shape to hold the arms so that the ring is in its contracted state.

9. An assembly according to claim 7 wherein the holding element is engaged with outwardly facing surfaces on the arms to hold the ring in said contracted state.

10. An assembly according to claim 6, wherein in that the holding element has a part whereby it may be gripped to remove it from the slot; said part being inserted between the ring arms to hold the ring in both grooves.

11. An assembly according to claim 6, wherein the ring has formations in its outer periphery adjacent to the arms for engagement by a tool to contract the ring to its closed state so that the holding element can be engaged with said arms.

12. A method of securing together, by means of a spring ring (41, 60, 80), an external member (36, 40) in telescopic relation with an internal member (25, 32), wherein the external member has a bore (48), an internal groove (46) in the bore and a slot (47) extending radially of the bore between an inner end open to the bore and an outer end (49) at the external surface of the member, the slot extending axially between said groove and an end of the member, wherein the internal member (25, 32) has an external groove (45), wherein the spring ring is engaged in said grooves to secure the members together and has, adjacent to its ends, arms (42, 61, 83) which extend generally radially outwardly into said slot (47); the method comprising mounting the spring ring (41, 60, 80) in one of said grooves (45, 46), releasably holding the ring in a contracted or expanded state so that it lies substantially within said one groove, telescoping the members together while the ring is in said state until the grooves in the members are mutually aligned and releasing the ring so that the ring expands or contracts to engage in both of the mutually aligned grooves (45, 46) to secure the members together; the method being characterised in that generally radial, oppositely-facing surfaces (44, 62, 63, 64, 65, 83, 84, 86, 87) on the arms are engaged with oppositely facing surfaces (53, 70, 72, 92, 93, 94) on a holding element (51, 66, 88, 90) prior to the telescoping of the members so as to hold the ring in said contracted or expanded state in said one groove and so that the holding element is supported solely by the arms, in that the holding element is located in said slot when the members have been telescoped so that said grooves are aligned, and in that the holding element is disengaged from said arms to release the ring by radial movement out of said slot.

* * * * *